United States Patent
L'Her et al.

(10) Patent No.: US 9,297,919 B2
(45) Date of Patent: Mar. 29, 2016

(54) METHOD AND DEVICE FOR ESTIMATING AN INTER-NODE DISTANCE BETWEEN NODES ARRANGED ALONG TOWED ACOUSTIC LINEAR ANTENNAS

(71) Applicant: SERCEL, Carquefou (FR)

(72) Inventors: Christophe L'Her, Loperhetfrance (FR); Simon Vallez, Brest (FR)

(73) Assignee: SERCEL, Carquefou (FR)

( * ) Notice: Subject to any disclaimer, the term of this patent is extended or adjusted under 35 U.S.C. 154(b) by 396 days.

(21) Appl. No.: 13/720,398

(22) Filed: Dec. 19, 2012

(65) Prior Publication Data

US 2013/0155808 A1    Jun. 20, 2013

(30) Foreign Application Priority Data

Dec. 19, 2011 (EP) .................................. 11306697

(51) Int. Cl.
| | |
|---|---|
| *G01V 1/38* | (2006.01) |
| *G01S 1/72* | (2006.01) |
| *G01S 11/14* | (2006.01) |

(52) U.S. Cl.
CPC . *G01V 1/38* (2013.01); *G01S 11/14* (2013.01); *G01V 1/3808* (2013.01); *G01S 1/72* (2013.01); *G01V 1/3835* (2013.01); *G01V 1/3861* (2013.01)

(58) Field of Classification Search
CPC .......... G01V 1/3835; G01S 11/14; G01S 1/72
USPC ........................................................ 367/19
See application file for complete search history.

(56) References Cited

U.S. PATENT DOCUMENTS

| | | | | |
|---|---|---|---|---|
| 4,992,990 | A | * | 2/1991 | Langeland et al. ............. 367/19 |
| 5,031,159 | A | * | 7/1991 | Rouquette ..................... 367/125 |
| 5,119,341 | A | * | 6/1992 | Youngberg ........................ 367/5 |
| 5,357,484 | A | * | 10/1994 | Bates et al. .................... 367/118 |
| 5,668,775 | A | * | 9/1997 | Hatteland ....................... 367/19 |
| 7,518,951 | B2 | * | 4/2009 | Solheim et al. ................ 367/130 |
| 7,660,192 | B2 | * | 2/2010 | Paulsen ........................... 367/19 |
| 2007/0091719 | A1 | * | 4/2007 | Falkenberg et al. ............. 367/19 |
| 2007/0223308 | A1 | * | 9/2007 | Frivik et al. ..................... 367/19 |

(Continued)

FOREIGN PATENT DOCUMENTS

| | | | |
|---|---|---|---|
| GB | 1194282 A | * | 6/1970 |
| GB | 2425597 A | | 11/2006 |

(Continued)

OTHER PUBLICATIONS

European Search Report and Written Opinion dated May 24, 2012 for corresponding European Patent Application No. 11 30 6697 (4 pages).

European Search Report and Written Opinion dated May 30, 2012 for related European Patent Application No. 11 30 6698 (4 pages).

*Primary Examiner* — Ian J Lobo

(74) *Attorney, Agent, or Firm* — David D. Brush; Westman, Champlin & Koehler, P.A.

(57) ABSTRACT

A method and apparatus are provided for estimating an inter-node distance between a sender node and a receiver node belonging to a network comprising a plurality of nodes arranged along towed acoustic linear antennas. An acoustic signal is transmitted from the sender node to the receiver node through an underwater acoustic channel. The method includes estimating the inter-node distance as a function of an estimate of a sound speed profile of the underwater acoustic channel, the sound speed profile depending on depth.

9 Claims, 6 Drawing Sheets

(56) References Cited

U.S. PATENT DOCUMENTS

| | | | |
|---|---|---|---|
| 2007/0230268 A1* | 10/2007 | Hoogeveen et al. | 367/19 |
| 2008/0304358 A1* | 12/2008 | Mellier et al. | 367/19 |
| 2009/0296519 A1* | 12/2009 | Keers et al. | 367/19 |
| 2010/0002537 A1 | 1/2010 | Welker | |
| 2010/0202249 A1* | 8/2010 | Goujon et al. | 367/19 |
| 2012/0230150 A1* | 9/2012 | Sudow et al. | 367/19 |
| 2012/0327741 A1* | 12/2012 | Pearce | 367/19 |

FOREIGN PATENT DOCUMENTS

| | | |
|---|---|---|
| GB | 2443562 A | 5/2008 |
| GB | 2477148 A | 7/2011 |
| WO | 2005096018 A1 | 10/2005 |

* cited by examiner

METHOD AND DEVICE FOR ESTIMATING AN INTER-NODE DISTANCE BETWEEN NODES ARRANGED ALONG TOWED ACOUSTIC LINEAR ANTENNAS

CROSS-REFERENCE TO RELATED APPLICATIONS

None.

STATEMENT REGARDING FEDERALLY SPONSORED RESEARCH OR DEVELOPMENT

None.

THE NAMES OF PARTIES TO A JOINT RESEARCH AGREEMENT

None.

FIELD OF THE DISCLOSURE

The field of the disclosure is the acquisition of geophysics data. It deals with the equipments required in order to study the sea bed and its sediment layers properties.

More specifically, the disclosure pertains to a technique for estimating an inter-node distance in a network of acoustic nodes arranged along towed acoustic linear antennas.

The disclosure can be applied notably to the oil prospecting industry using seismic method (sea oil survey), but can be of interest for any other field which requires a system performing geophysics data acquisition in a marine environment.

TECHNOLOGICAL BACKGROUND

It is sought more particularly here below in this document to describe problems existing in the field of seismic data acquisition for oil prospecting industry. The disclosure of course is not limited to this particular field of application but is of interest for any technique that has to cope with closely related or similar issues and problems.

The operations of acquiring seismic data on site conventionally use networks of sensors (here below designated as "hydrophones" with regard to the acquisition of data in a marine environment). The hydrophones are distributed along cables in order to form linear acoustic antennas normally referred to as "streamers" or "seismic streamers". As shown in FIG. 1, the network of seismic streamers $20a$ to $20e$ is towed by a seismic vessel 21. The hydrophones are referenced 16 in FIG. 2, which illustrates in detail the block referenced C in FIG. 1 (i.e. a portion of the streamer referenced $20a$).

The seismic method is based on analysis of reflected seismic waves. Thus, to collect geophysical data in a marine environment, one or more submerged seismic sources are activated in order to propagate omni-directional seismic wave trains. The pressure wave generated by the seismic source passes through the column of water and insonifies the different layers of the sea bed. Part of the seismic waves (i.e. acoustic signals) reflected are then detected by the hydrophones distributed over the length of the seismic streamers. These acoustic signals are processed and retransmitted by telemetry from the seismic streamers to the operator station situated on the seismic vessel, where the processing of the raw data is carried out.

A well-known problem in this context is the localization of the seismic streamers. Indeed, it is important to precisely locate the streamers, in particular for:

monitoring the position of the hydrophones (distributed along the seismic streamers) in order to obtain a satisfactory precision of the image of the sea bed in the exploration zone;

detecting the movements of the streamers with respect to one another (the streamers are often subjected to various external natural constrains of variable magnitude, such as the wind, waves, currents); and monitoring the navigation of streamers, in particular in a situation of bypassing an obstacle (such as an oil barge).

In practice, it is aimed to carry out an analyze of sea bed with a minimum number of passage of the vessel in the concerned area. For that purpose, the number of streamers implemented in the acoustic network is substantially raised. The aforesaid problem of localization of the streamers is thus particularly noticeably, especially in view of the length of the streamers, which may vary between 6 and 15 kilometers, for example.

Control of the positions of streamers lies in the implementation of navigation control devices, commonly referred to as "birds" (white squares referenced 10 in FIG. 1). They are installed at regular intervals (every 300 meters for example) along the seismic streamers. The function of those birds is to guide the streamers between themselves. In other words, the birds are used to control the depth as well as the lateral position of the streamers. For this purpose, and as illustrated in FIG. 2, each bird 10 comprises a body 11 equipped with motorized pivoting wings 12 (or more generally means of mechanical moving) making it possible to modify the position of the streamers laterally between them (this is referred to a horizontal driving) and drive the streamers in immersion (this is referred to a vertical driving).

To carry out the localization of the seismic streamers (allowing a precise horizontal driving of the streamers by the birds), acoustic nodes are distributed along the streamers. These acoustic nodes are represented by hatched squares, referenced 14, in FIGS. 1 and 2. As shown in FIG. 1, some acoustic nodes 14 of the network are associated with a bird 10 (case of FIG. 2), and other are not.

The acoustic nodes 14 use underwater acoustic communication means, hereafter referred to as electro-acoustic transducers, allowing to estimate the distances between acoustic nodes (named here below "inter-node distances"). More specifically, these transducers are transmitters and receivers of acoustic signals, which can be used to estimate an inter-node distance separating two acoustic nodes (acting as sender node and receiver node respectively) situated on two different streamers (which may be adjacent or not) as a function of an acoustic signal propagation duration measured between these two nodes (i.e. a travel time of the acoustic signal from the sender node to the receiver node). From the acoustic network, this thereby forms a mesh of inter-node distances allowing to know precise horizontal positioning of all the streamers.

Transducer here is understood to mean either a single electro-acoustic device consisting of a transceiver (emitter/receiver) of acoustic signals, or a combination of a sender device (e.g. a pinger) and a receiver device (e.g a pressure particle sensor (hydrophone) or a motion particle sensor (accelerometer, geophone . . . )).

Usually, each acoustic node comprises an electro-acoustic transducer enabling it to behave alternately as a sender node and a receiver node (for the transmission and the reception, respectively, of acoustic signals). In an alternative embodiment, a first set of nodes act only as sender nodes and a second set of nodes act only as receiver nodes. A third set of nodes (each acting alternately as a sender node and a receiver node) can also be used in combination with the first and second sets of nodes.

The inter-node distance $d_{AB}$ between two nodes A and B can be typically estimated on the basis of the following formula: $d_{AB}=c \cdot t_{AB}$, with:

node A acting as a sender node which transmits an acoustic signal S to node B acting as a receiver node (see example in FIG. 1, with acoustic signal S shown as an arrow between nodes referenced A and B);

$t_{AB}$, the propagation duration (travel time) elapsed between the emission instant and reception instant of the acoustic signal transmitted from the sender node A to the receiver node B (assuming that the receiver node and the sender node are synchronized); and c, a "measured" or "estimated" value of sound speed (also referred to as sound velocity) of the acoustic signal.

Computation of an inter-node distance can be carried out, either by the navigation system (for positioning the set of hydrophones), or the node manager system (for providing useful information to the birds for horizontal driving), or the acoustic nodes themselves (in case they are equipped with electronics intended for this computation). The acoustic nodes are further synchronized by the node manager system through a wire communication bus placed within the streamers.

In the known methods for estimating an inter-node distance, the sound speed c which is used is supposed to be constant in the vertical plane. However, in practice this will not be the case. The sound speed in the ocean widely depends on the temperature, pressure and salinity of water (especially) and thus is almost always depending on depth (z) considered; in that case we talk about sound speed profile (SSP) c(z).

The shape of the sound speed profile in the area where the seismic survey is performed can modify the acoustic paths of sound. The sound will not follow a straight line (as supposed in the inter-node distance estimation method described above) but a curved ray path due to the refraction phenomena (according to Snell Descartes laws). Indeed, in a non uniform medium the sound rays can be bended (refracted) due to the change of the sound speed and more precisely to its gradient. The wavefronts of the sound are refracted toward the layer where the sound speed is lower, the refraction will be more pronounced if the change in the sound speed is rapid.

FIGS. 3 to 5 illustrate the influence of a sound speed gradient in the channel. For each of these figures, the left part presents a sound speed profile and the right part presents the corresponding ray paths, obtained with a ray path tracing method for a 10° aperture launch, and a 300 m-distance. Those figures enable to compare the ray paths followed by the sound in two mediums.

As can be seen in the left part of these figures, the first medium (FIG. 5) is a 50 m depth water column with a constant sound speed and the second medium (FIGS. 3 and 4) is a medium constituted with a 50 m water column and a 25 m depth minimum of sound speed with a constant gradient.

As can be seen in the right part of these figures, the depth of the source (sender node) is 25 m in FIGS. 3 and 5, 30 m in FIG. 4. The sound will follow straight paths in the first case (FIG. 5), and strongly curved paths in the second case, depending on depth (FIGS. 3 and 4).

When the path is curved, the distance along the path will be more important than in the straight line case. Thus the inter-node distance obtained with the previous method (assuming a constant sound speed profile) will be over estimated which is a synonym of a lack of localization precision or a bias in the localization result (the localization of the streamers being based on the inter-node distances obtained with a plurality of couples of acoustic nodes).

As described in the previous paragraphs, the sound speed value which is used, in the known methods, to estimate the inter-node distance is supposed to be constant in the vertical plane, which is usually a wrong assumption. Moreover, the environmental conditions (temperature, pressure or salinity of water), can change in a fast way depending on position and on weather conditions (sea state, sun influence, currents etc. ... ). The shape of the sound speed profile can thus imply refraction phenomena which curves the ray paths. The classical formula used to estimate the inter-node distance ($d_{AB}=c \cdot t_{AB}$) will not be valid any more and the travel time $t_{AB}$ will be a travel time on a curve (i.e. an arc length $L_{AB}$) and not on a straight line.

Assuming a constant sound speed, an error on this sound speed value will imply a small error on the estimated distance between two close nodes. For instance, for an inter-node distance $d_{AB}$=300 m, a 0.5 ms-1 error (classical value for a sound velocimeter) is equivalent to a 10 cm error on the inter-node distance. On the opposite, assuming for example the sound speed profile of the left part of FIG. 6 (50 m water column and a 25 m depth minimum of sound speed with a constant gradient), and a 15 m depth source, the direct path is illustrated in the right part of FIG. 6 (obtained with a ray path tracing method for a 10° aperture launch, and a 300 m-distance). The direct path length is equal to 300.70 m, which correspond to a 70 cm error on the inter-node distance when assuming a constant sound speed of 1482 ms-1 (at 15 m-depth) and a real distance of 300 m.

Moreover, if the two nodes A and B considered are not at the same depth, the ray path from node A to node B and the one from node B to node A can be different and so the travel time can be different depending on the way of the signal.

As shown in FIG. 7, in warm ocean region, a typical sound speed profile has three parts corresponding to the three layers of the water column: the surface layer (mixed layer), the main thermocline and the deep isothermal layer. The mixed layer can be few meters thick, but can also extend to several dozens of meter (depending on seasons, sun, sea state, currents ... ). The mixed layer can disappear in colder oceans. The sound speed is almost constant for the mixed layer, but not for the main thermocline and the deep isothermal layer. The tendency in the field of seismic data acquisition is to increase the depth of the streamer which can place the streamer (and the acoustic nodes) under the mixed layer (and therefore in the main thermocline) and thus increase the refraction phenomena. As detailed above, this refraction phenomena causes an error if the classical formula is used to estimate the inter-node distance.

SUMMARY

An exemplary embodiment of the present disclosure proposes a method for estimating an inter-node distance between a sender node and a receiver node belonging to a network comprising a plurality of nodes arranged along towed acoustic linear antennas, an acoustic signal being transmitted from the sender node to the receiver node through an underwater acoustic channel. The method comprises a step of estimating the inter-node distance as a function of an estimate of a sound speed profile of the underwater acoustic channel, said sound speed profile depending on depth.

An exemplary embodiment relies on a wholly novel and inventive feature because it takes into account the environment properties, represented especially by the sound speed profile of the underwater acoustic channel (between the sender node and the receiver node). Thus, this technique for estimating the inter-node distance is more precise than the known solution discussed above, and eliminates (or at least reduce) the potential bias induced by the refraction phenomena.

In a first implementation, said step of estimating the inter-node distance comprises steps of:
- obtaining a travel time of the acoustic signal from the sender node to the receiver node, immersion depths of the sender node and the receiver node, a sound speed at the immersion depth of the sender node and said estimate of the sound speed profile;
- determining an approximated inter-node distance, corresponding to a straight line path between the sender node and the receiver node, as a function of the travel time and the sound speed at the immersion depth of the sender node;
- estimating the sound propagation between the sender node and the receiver node, using a sound propagation model and knowing the immersion depths of the sender node and the receiver node, the approximated inter-node distance and the estimate of the sound speed profile, said step of estimating the sound propagation providing an arc length of an arc path between the sender node and the receiver node; and
- determining an estimate of the inter-node distance, as the difference between said approximated inter-node distance and a distance estimation error defined as the difference between said arc length and said approximated inter-node distance.

This first implementation involves determining an approximated inter-node distance according to the known method (assuming a constant sound speed in the channel), and then to correct the error on this approximated inter-node distance. The error is determined using a sound propagation model (e.g. ray theory model) and, among other assumptions, the estimate of the sound speed profile of the underwater acoustic channel.

We make the hypothesis that the length of the arc path provided by the step of estimating the sound propagation (whose end is positioned, straight line, at the approximated inter-node distance from the sender node) is approximately equal to the length of the real arc path (whose end is positioned, straight line, at the true inter-node distance from the sender node).

According to a particular feature, the step of obtaining the estimate of the sound speed profile is carried out using at least one method belonging to the group comprising:
- methods of consulting at least one sound speed profiles database; and
- methods of direct measuring, using a measurement device and/or an acoustic method.

In other words, the estimate of the sound speed profile is obtained in a conventional and simple manner.

According to a particular feature, the step of obtaining the estimate of the sound speed profile is carried out with a method of indirect measuring, using an inversion process which extracts the estimate of the sound speed profile from at least one distorted acoustic signal resulting from the transmission of an acoustic signal between a couple of nodes through said underwater acoustic channel.

Thus the estimate of the sound speed profile is obtained using an inversion process. This is more accurate than consulting databases, without requiring measurement device and corresponds to the sound speed profile between the two nodes of the considered couple of nodes.

According to a particular feature, said inversion process extracts the estimate of the sound speed profile from a distorted acoustic signal resulting from the transmission of said acoustic signal between said sender node and said receiver node through said underwater acoustic channel.

Thus only one couple of nodes is used (the couple of nodes for which the inter-node distance is estimated).

According to a particular feature, at least two iterations of said inversion process are executed exploiting a spatial diversity, using at least two different couples of nodes, and/or a time diversity, using a same couple of nodes at at least two different instants, each iteration providing an intermediate estimate of the sound speed profile, and the step of obtaining the estimate of the sound speed profile comprises a step of combining the intermediate estimates of the sound speed profile to obtain a final estimate of the sound speed profile.

The greater the number of iterations (and therefore the number of intermediate estimates), the better the final estimate of the sound speed profile is.

According to a particular feature, said at least two different couples of nodes have different depths, a first and a second couple of nodes being defined as having different depths if a sender node of the first couple has not the same depth as a sender node of the second couple, and/or if a receiver node of the first couple has not the same depth as a receiver node of the second couple.

This allows a vertical water column sampling which gives better results for the final estimate of the sound speed profile.

In a second implementation, said step of estimating the inter-node distance comprises a step of using an inversion process which extracts jointly an estimate of the sound speed profile and an estimate of the inter-node distance, from a distorted acoustic signal resulting from the transmission of said acoustic signal between said sender node and said receiver node through said underwater acoustic channel.

In this second implementation, contrarily to the first embodiment, there is no assumption concerning the sound speed profile and no need of a prior step of estimation the sound propagation (the sound speed profile is inverted at the same time as the inter-node distance). Therefore, logically, the estimate of the sound speed profile and the estimate of inter-node distance are more precise.

In a third implementation, said step of estimating the inter-node distance comprises steps of:
- obtaining said estimate of the sound speed profile; and
- using an inversion process which extracts an estimate of the inter-node distance, from a distorted acoustic signal resulting from the transmission of said acoustic signal between said sender node and said receiver node through said underwater acoustic channel, and knowing said estimate of the sound speed profile.

In this third implementation, as in the first embodiment, there is an assumption concerning the sound speed profile, but contrarily to the first embodiment there is no need of a prior step of estimation the sound propagation (the inter-node distance is inverted). Therefore, the estimate of inter-node distance are more precise. The third embodiment is less expensive than the second embodiment in terms of computation time.

According to a particular feature (of the third implementation), the step of obtaining the estimate of the sound speed profile is carried out using at least one method belonging to the group comprising:
- methods of consulting at least one sound speed profiles database; and
- methods of direct measuring, using a measurement device and/or an acoustic method.

In other words, the estimate of the sound speed profile is obtained in a conventional and simple manner.

According to a particular feature (of any one of the second and third implementations), said step of estimating the inter-node distance comprises steps of:
- obtaining a travel time of the acoustic signal from the sender node to the receiver node, an immersion depth of the sender node, a sound speed at the immersion depth of the sender node;
- determining an approximated inter-node distance, corresponding to a straight line path between the sender node and the receiver node, as a function of the travel time and the sound speed at the immersion depth of the sender node;
- and said inversion process is initialized with said approximated inter-node distance.

In other words, the inversion process (which extracts the estimate of the inter-node distance) is initialized with an approximated inter-node distance determined simply (according to the known method, assuming a constant sound speed in the channel).

According to a particular feature (of any one of the first, second and third implementations), the method is implemented by said receiver node or a centralized system.

Another embodiment pertains to a computer program product comprising program code instructions for implementing the above-mentioned method (in any of its different embodiments) when said program is executed on a computer or a processor.

Another embodiment pertains to a non-transitory computer-readable carrier medium, storing a program which, when executed by a computer or a processor, causes the computer or the processor to carry out the above-mentioned method (in any of its different embodiments).

Another embodiment proposes a device for estimating an inter-node distance between a sender node and a receiver node belonging to a network comprising a plurality of nodes arranged along towed acoustic linear antennas, an acoustic signal being transmitted from the sender node to the receiver node through an underwater acoustic channel, characterized in that the device comprises means for estimating the inter-node distance as a function of an estimate of a sound speed profile of the underwater acoustic channel, said sound speed profile depending on depth.

LIST OF FIGURES

Other features and advantages of embodiments shall appear from the following description, given by way of an indicative and non-exhaustive examples and from the appended drawings, of which:

FIG. 1, already described with reference to the prior art, presents an example of network of seismic streamers towed by a seismic vessel;

FIG. 2, already described with reference to the prior art, illustrates in detail the block referenced C in FIG. 1 (i.e. a portion of the streamer);

FIGS. 3 to 6, already described with reference to the prior art, each present a sound speed profile (left part of the figure) and corresponding ray paths (right part of the figure);

FIG. 7, already described with reference to the prior art, presents an example of sound speed profile, typical of warm ocean region;

DETAILED DESCRIPTION

FIGS. 1 to 7 have been already described above in relation with the prior art.

In the following description, it is considered as an example the estimation of the inter-node distance between the sender node A and the receiver node B, shown in FIG. 1 and belonging to a network of nodes 14 arranged along seismic streamers 20a to 20e.

Figure 8:
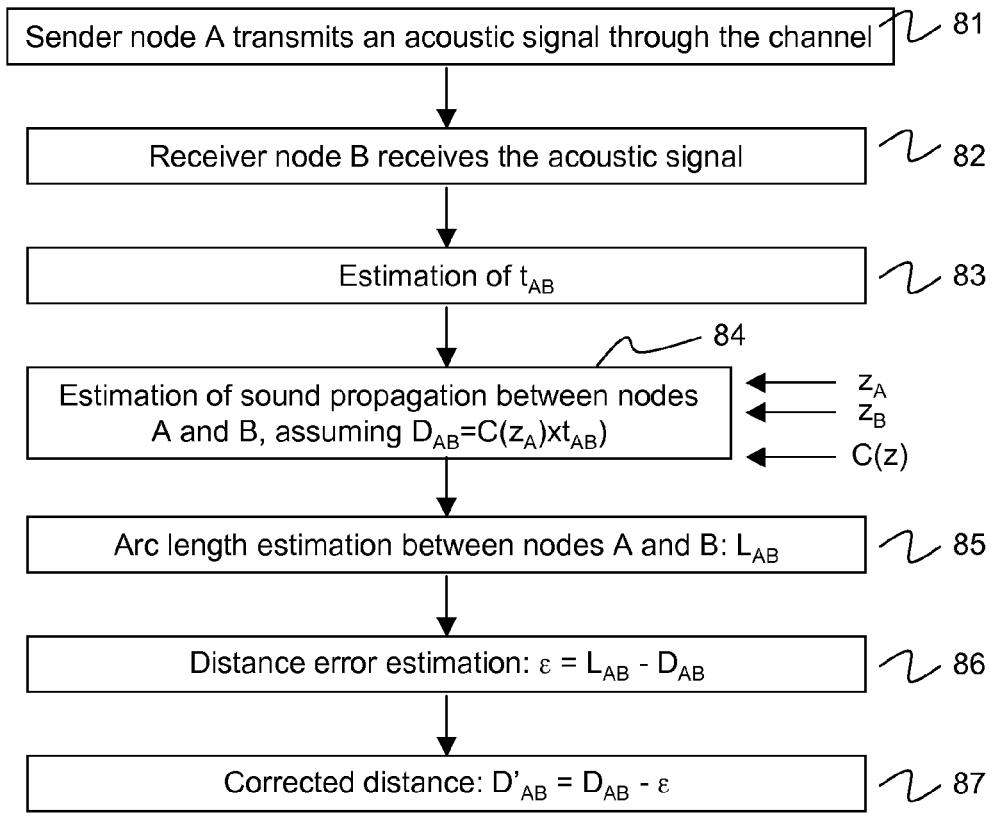
FIG. 8 is a flowchart of a first embodiment of the method.

Referring now to FIG. 8, we present a first embodiment of the method.

In step 81, the sender node A transmits an acoustic signal to the receiver node B, through a underwater acoustic channel In step 82, the receiver node B receives the acoustic signal.

The step 83 consists in measuring the travel time $t_{AB}$ between the sender node A and the receiver node B.

In step 84, knowing the sound speed $C(z_A)$ at the immersion depth $z_A$ of the node A, an approximated inter-node distance $D_{AB}$ between nodes A and B is determined, using the classical following formula: $D_{AB}=C(z_A)*t_{AB}$.

Also in step 84, knowing the immersion depths of nodes A and B ($z_A$ and $z_B$ respectively, which can be different from each other), the approximated inter-node distance $D_{AB}$ (see above), and an estimate of the sound speed profile $C(z)$, we estimate the sound propagation between nodes A and B (using a sound propagation model, e.g. ray theory model; the corresponding method is called "ray path tracing method"), i.e. we estimate the shape (which is an arc) of the real path between nodes A and B (the length $L_{AB}$ of this arc is estimated in step 85).

Other sound propagation models can be used in place of ray theory model to assess the received signal at the node B, such as parabolic equation, wavenumber integration or normal modes (the choice depends on frequency considered, water depth, range dependency . . . ).

Different ways to obtain an estimate of the sound speed profile $C(z)$ are described below.

In step 85, the length $L_{AB}$ of the arc (real path) between nodes A and B is estimated.

In step 86, knowing the arc length $L_{AB}$, we can compute a distance estimation error: $\epsilon=L_{AB}-D_{AB}$.

Finally, in step 87, we can determine a corrected distance $D'_{AB}$, i.e. an estimate of the inter-node distance between the nodes A and B, by computing: $D'_{AB}=D_{AB}-\epsilon$.

Thus the inter-node distance between nodes A and B is estimated more precisely.

There are different ways to obtain an estimate of the sound speed profile $C(z)$:
- using prior knowledge on the environment: consulting worldwide sound speed profile databases;
- using a method of direct measuring: using measurement device (such as bathythermograph, expendable bathythermograph (XBT), expendable sound velocimeter (XSV), sound velocimeter, etc); or
- using a method of indirect measuring: using an inversion process (see below the description of FIG. 11); or
- using an acoustic method on the different nodes of the layout in order to exploit their potential different depths (cf. BroadSeis method (trademark)).

Figure 11:
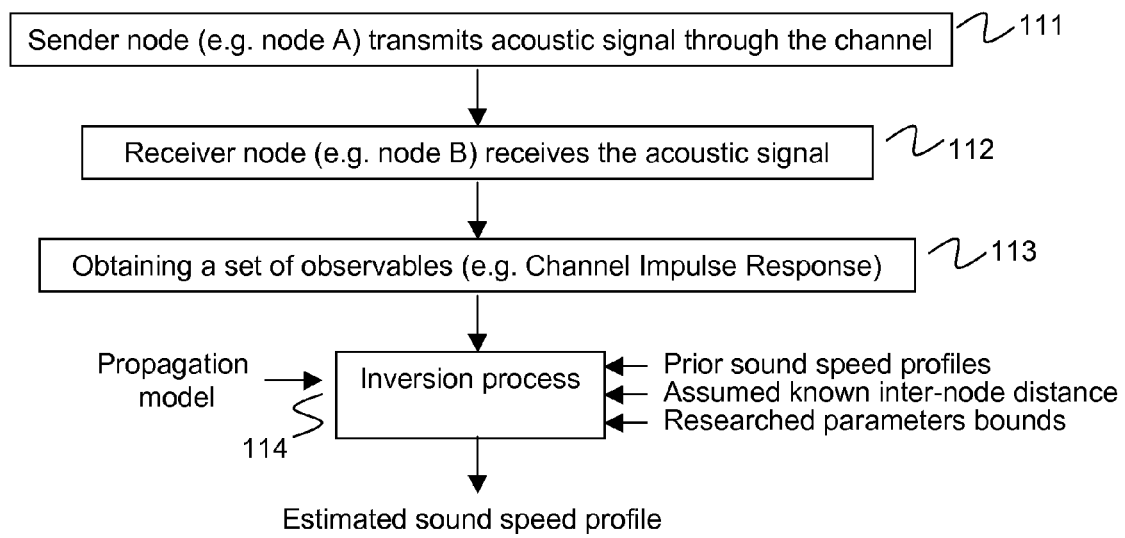
FIG. 11 is a flowchart of an inversion process providing an estimate of the sound speed profile, to be used as input in the first embodiment of FIG. 8.

FIG. 11 is a flowchart of an inversion process providing an estimate of the sound speed profile C(z), to be used as input in the first embodiment of FIG. 8.

In step 111, a sender node (e.g. node A or a node close to node A) transmits an acoustic signal to the receiver node (e.g. node B or a node close to node B), through the underwater acoustic channel.

In step 112, the receiver node receives the acoustic signal, as a distorted received signal depending on the channel properties. Indeed, the signal emitted by the nodes will undergo reflections on the ocean surface and on the seafloor, or refractions due to sound speed gradient.

In step 113, we obtain a set of observables (data) from the distorted received signal. For instance, the observables can be the impulse response of the channel between the two nodes.

In step 114, the observables are used to perform an inversion of the environment properties and especially the sound speed profile, assuming the inter-node distance (between the sender node and the receiver node) is known and equal to the previously obtained approximated inter-node distance between nodes A and B ($D_{AB}=C(z_A)*t_{AB}$). In other words, using the observables extracted from the distorted received signal and matching them to a propagation model (though an optimization process of a cost function) allows to obtain an estimate of the sound speed profile. For instance, if the observables are the impulse response of the channel between the two nodes, thus performing a matched impulse response process (MIR) gives an estimate of the sound speed profile (by comparison of the observed impulse response with modeled impulse responses each corresponding to a different known sound speed profile).

In step 114, the inversion process can be initialized with an estimate obtained by consulting worldwide sound speed profile databases or by using a method of direct measuring (see details above).

In a variant, in order to obtain better results, several iterations (also called realizations) of the inversion process of FIG. 11 are executed, so as to exploit a spatial diversity (using different couples of nodes) and/or a time diversity (using a same couple of nodes at at least two different instants). Each iteration provides an intermediate estimate of the sound speed profile (e.g. by computing an average).

In this variant, if the different nodes are positioned at different depths, the vertical water column sampling obtained gives better results for the sound speed profile estimation. In other words, it is advantageous that the different couples of nodes have different depths. We use the following definition: a first and a second couple of nodes have different depths if a sender node of the first couple has not the same depth as a sender node of the second couple, and/or if a receiver node of the first couple has not the same depth as a receiver node of the second couple.

Figure 9:
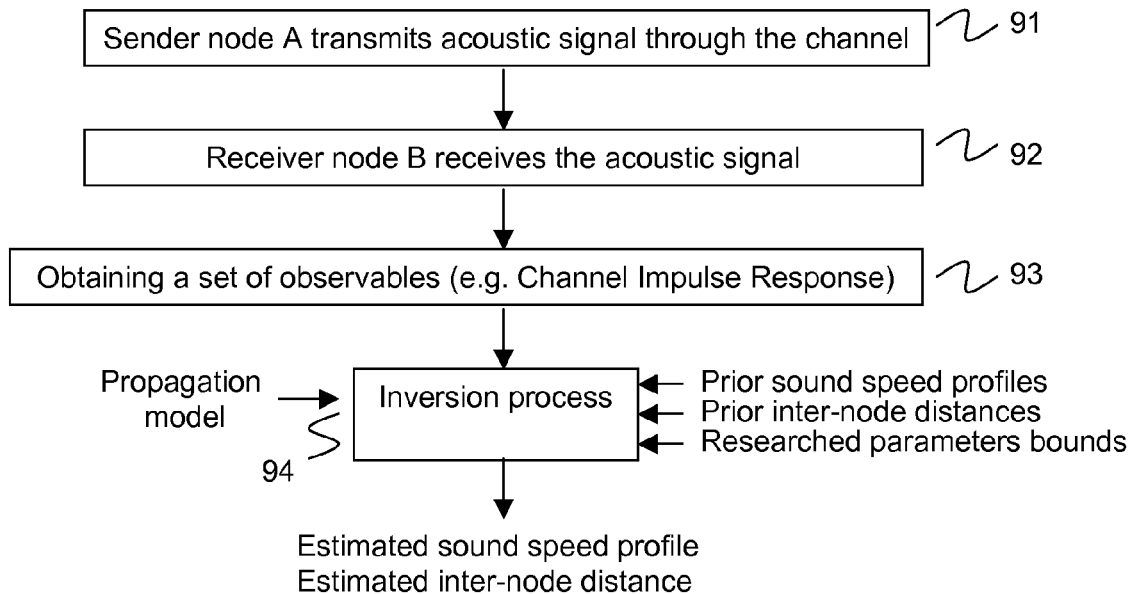
FIG. 9 is a flowchart of a second embodiment of the method.

Referring now to FIG. 9, we present a second embodiment of the method (inversion process which extracts jointly an estimate of the sound speed profile and an estimate of the inter-node distance).

In step 91, the sender node A transmits an acoustic signal to the receiver node B, through an underwater acoustic channel (i.e. a column of water).

In step 92, the receiver node B receives the acoustic signal, as a distorted received signal depending on the channel properties. Indeed, the signal emitted by the nodes will undergo reflections on the ocean surface and on the seafloor, or refractions due to sound speed gradient.

In step 93, we obtain a set of observables (data) from the distorted received signal. For instance, the observables can be the impulse response of the channel between the two nodes.

In step 94, the observables are used to perform an inversion of the environment properties and especially an estimate of the sound speed profile and jointly an estimate of the inter-node distance $L_{AB}$. In other words, using the observables extracted from the distorted received signal and matching them to some obtained with a propagation model (though an optimization process of a cost function) allows to obtain jointly an estimate of the sound speed profile and an estimate of the inter-node distance. For instance, if the observables are the impulse response of the channel between the two nodes, thus performing a matched impulse response process (MIR) gives an estimate of the sound speed profile and an estimate of the inter-node distance (by comparison of the observed impulse response with modeled impulse responses each corresponding to a different couple of a known sound speed profile and a known inter-node distance).

In step 94, the inversion process can be initialized with the approximated inter-node distance $D_{AB}$ (determined as described for the first embodiment illustrated in FIG. 8: $D_{AB}=C(z_A)*t_{AB}$), i.e. an inter-node distance estimated assuming a constant sound speed.

Figure 10:
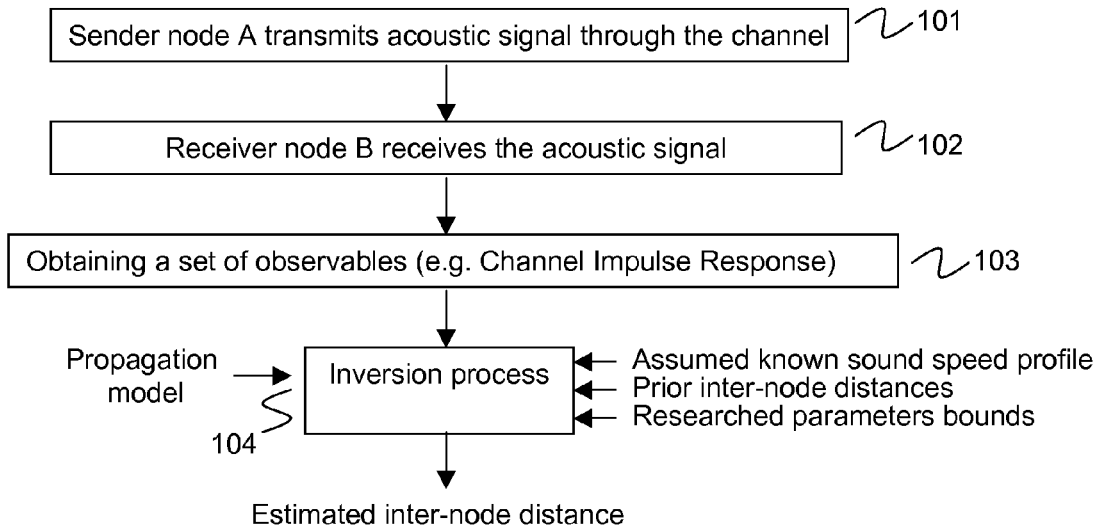
FIG. 10 is a flowchart of a third embodiment of the method.

Referring now to FIG. 10, we present a third embodiment of the method (inversion process which extracts only an estimate of the inter-node distance).

In step 101, the sender node A transmits an acoustic signal to the receiver node B, through an underwater acoustic channel (i.e. a column of water).

In step 102, the receiver node B receives the acoustic signal, as a distorted received signal depending on the channel properties. Indeed, the signal emitted by the nodes will undergo reflections on the ocean surface and on the seafloor, or refractions due to sound speed gradient.

In step 103, we obtain a set of observables (data) from the distorted received signal. For instance, the observables can be the impulse response of the channel between the two nodes.

In step 104, the observables are used to perform an inversion of the environment properties and especially an estimate of the inter-node distance, assuming the sound speed profile is known (e.g. by consulting worldwide sound speed profile databases or by using a method of direct measuring—see details above). In other words, using the observables extracted from the distorted received signal and matching them to a propagation model (though an optimization process of a cost function) allows to obtain an estimate of the inter-node distance. For instance, if the observables are the impulse response of the channel between the two nodes, thus performing a matched impulse response process (MIR) gives an estimate of the inter-node distance (by comparison of the observed impulse response with modeled impulse responses each corresponding to a different known inter-node distance).

Figure 1:
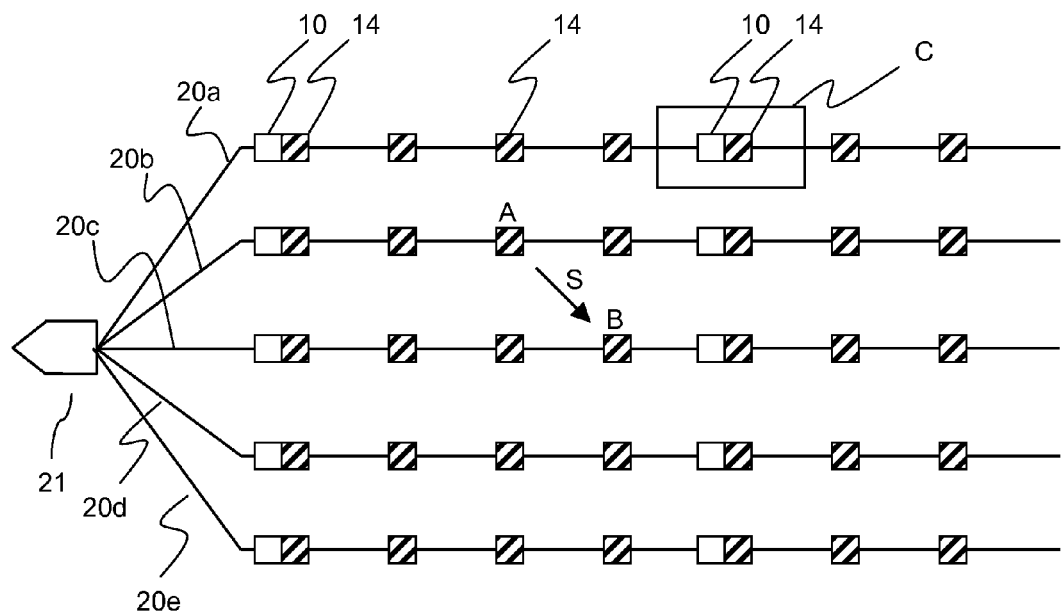
Figure 2:
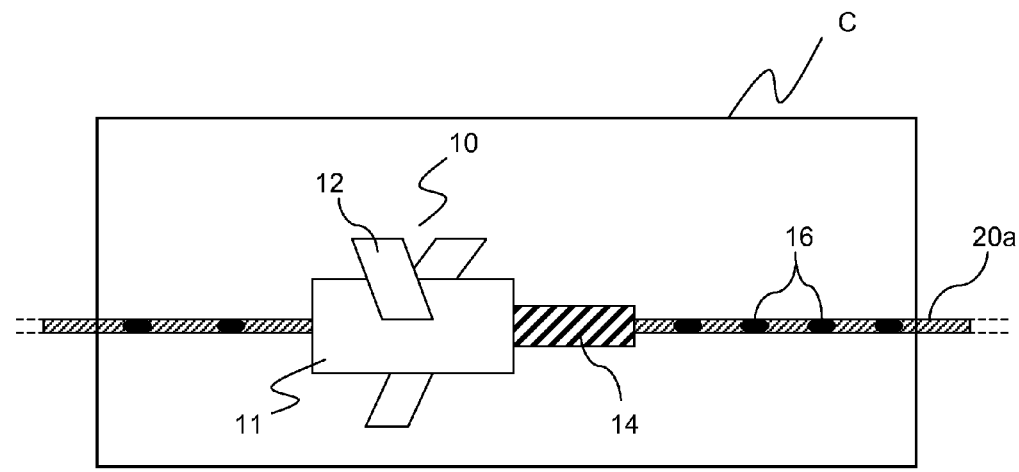
Figure 3:
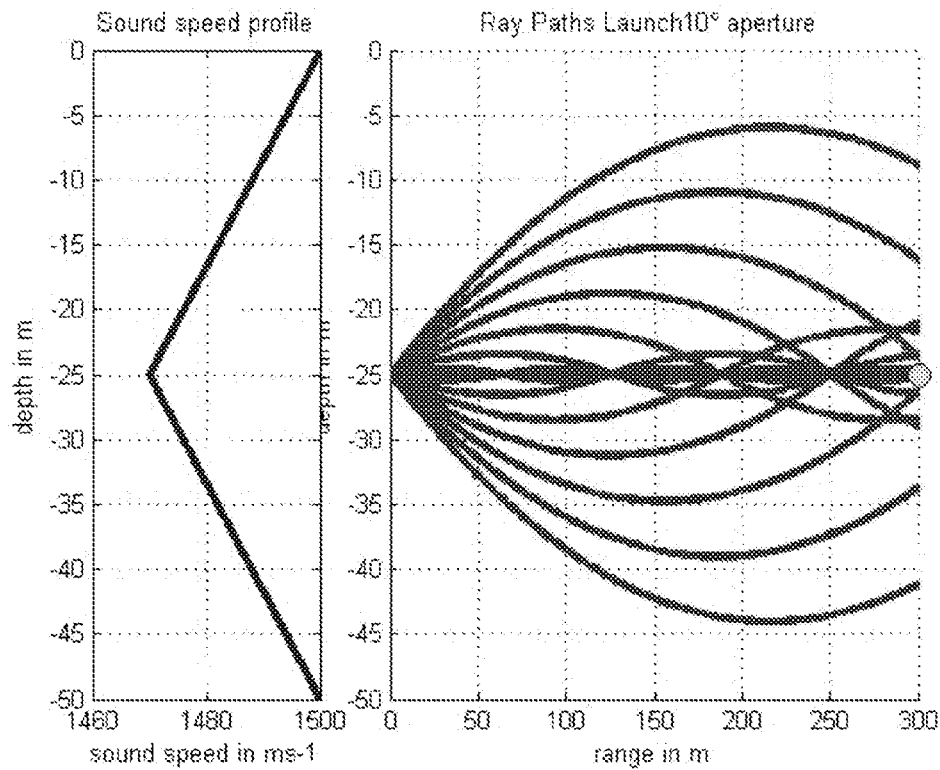
Figure 4:
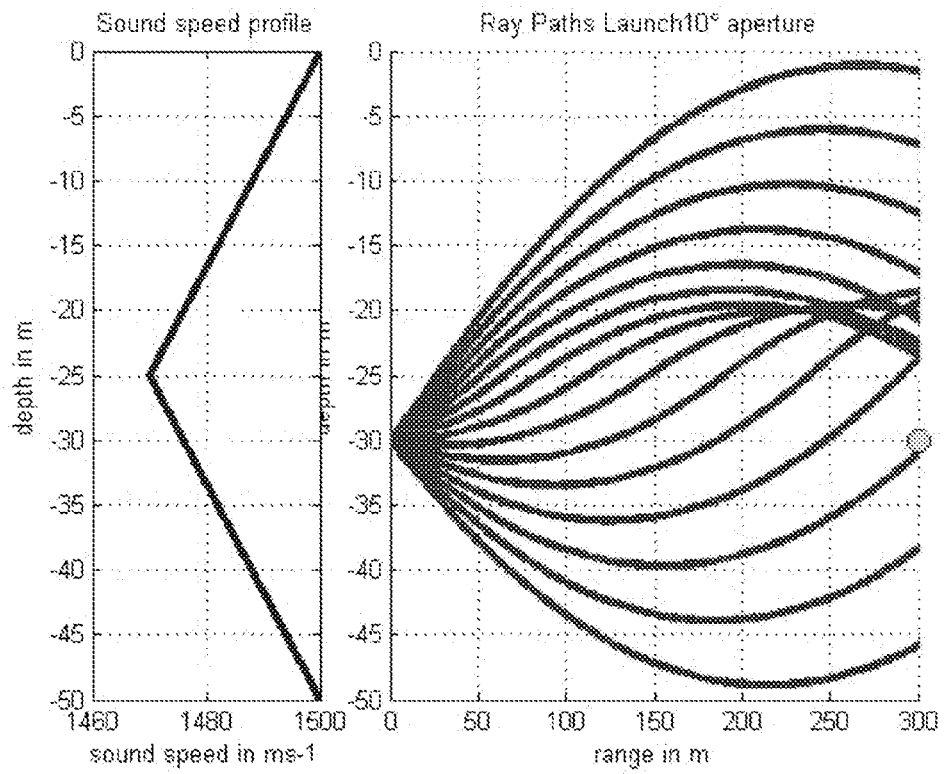
Figure 5:
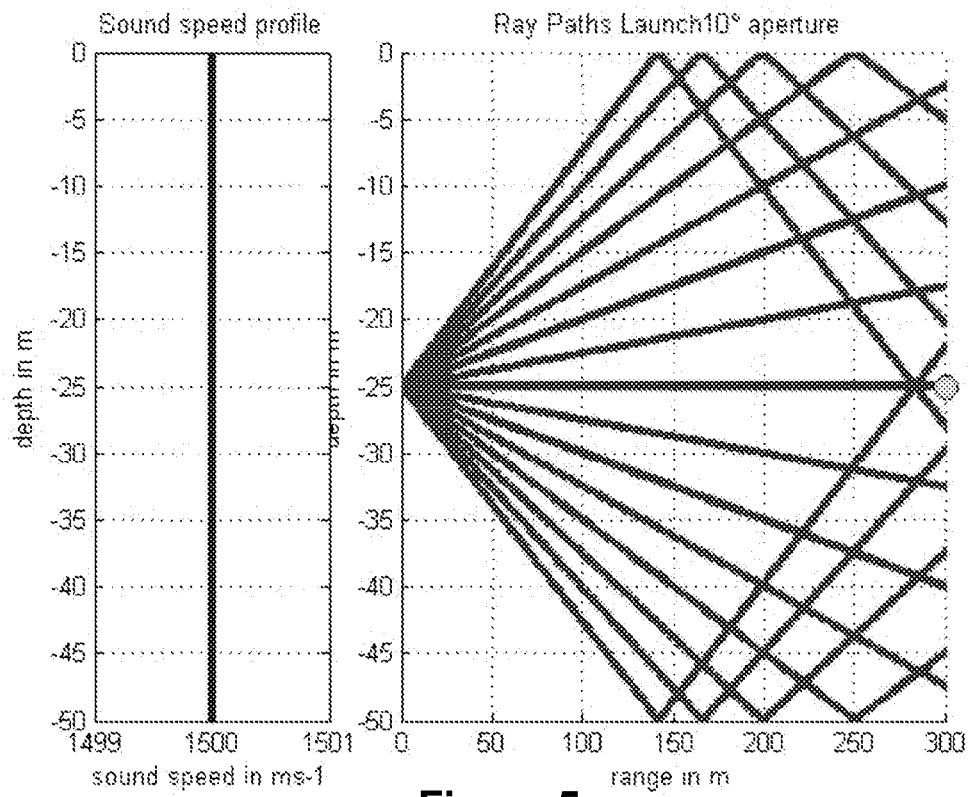
Figure 6:
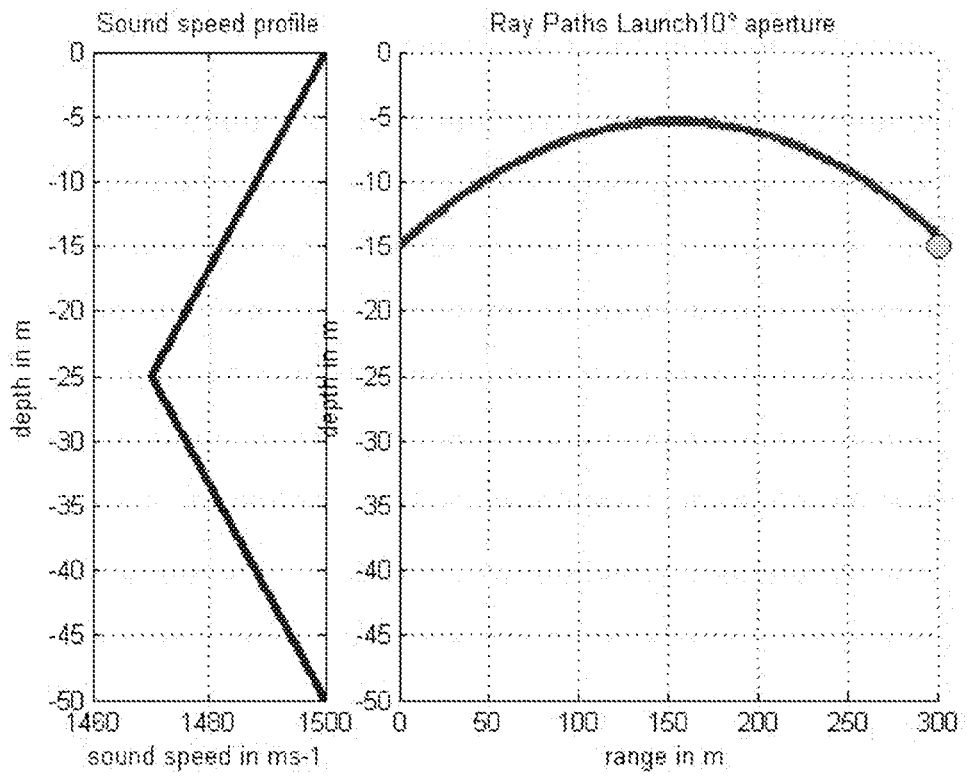
Figure 7:
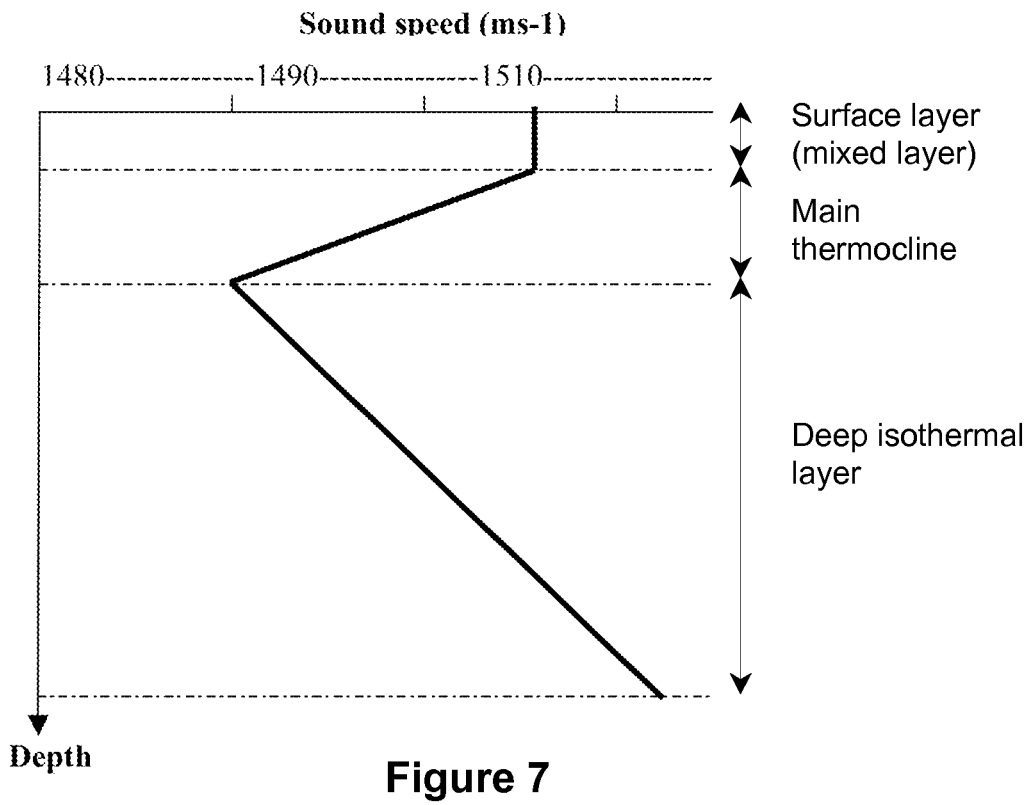

In step 104, the inversion process can be initialized with the approximated inter-node distance $D_{AB}$ (determined as described for the first embodiment illustrated in FIG. 1), i.e. an inter-node distance estimated assuming a constant sound speed.

Figure 12:
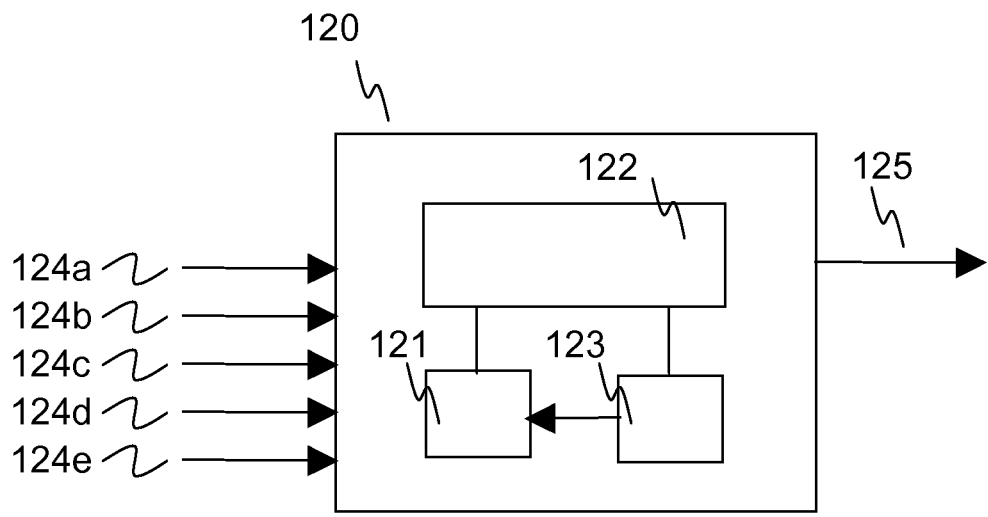
FIG. 12 shows the simplified structure of an estimation device according to a particular embodiment.

Now referring to FIG. 12, we present the simplified structure of an estimation device 120 (for estimating an inter-node distance) according to a particular embodiment.

The estimation device 120 can be an acoustic node (such as the receiver node B in the example above), the node manager system or the navigation system. It comprises a read-only memory (ROM) 123, a random access memory (RAM) 121 and a processor 122. The read-only memory 123 (non transitory computer-readable carrier medium) stores executable program code instructions, which they are executed by the processor 122 enable implementation of the technique of the present disclosure (e.g. the steps 82 to 87 of FIG. 8; or the steps 92 to 94 of FIG. 9; or the steps 102 to 104 of FIG. 10).

Upon initialization, the aforementioned program code instructions are transferred from the read-only memory 123 to the random access memory 121 so as to be executed by the processor 122. The random access memory 121 likewise includes registers for storing the variables and parameters required for this execution. The processor 122 receives the following information (referenced 124a to 124e respectively):

the acoustic signal (transmitted by the sender node and received by the receiver node), the sound speed $C(z_A)$ at the immersion depth $z_A$ of the node A, the immersion depths of nodes A and B, $z_A$ and $z_B$ respectively, the estimate of the sound speed profile $C(z)$, and a propagation model.

According to the program code instructions, the processor 122 delivers an estimation of the inter-node distance 125.

All the steps of the above estimation method can be implemented equally well:

by the execution of a set of program code instructions executed by a reprogrammable computing machine such as a PC type apparatus, a DSP (digital signal processor) or a microcontroller. This program code instructions can be stored in a non-transitory computer-readable carrier medium that is detachable (for example a floppy disk, a CD-ROM or a DVD-ROM) or non-detachable; or by a dedicated machine or component, such as an FPGA (Field Programmable Gate Array), an ASIC (Application-Specific Integrated Circuit) or any dedicated hardware component.

A non-limiting, exemplary embodiment of the disclosure provides a technique for estimating the inter-node distance which is more precise than the known solution discussed in the Background section.

An embodiment of the disclosure provides a technique of this kind that is simple to implement and costs little.

Although the present disclosure has been described with reference to one or more examples, workers skilled in the art will recognize that changes may be made in form and detail without departing from the scope of the disclosure and/or the appended claims.

The invention claimed is:

1. A method comprising:

estimating an inter-node distance between a sender node and a receiver node belonging to a network comprising a plurality of nodes arranged along towed acoustic linear antennas, an acoustic signal being transmitted from the sender node to the receiver node through an underwater acoustic channel, wherein estimating comprises:

estimating the inter-node distance as a function of an estimate of a sound speed profile of the underwater acoustic channel, said sound speed profile depending on depth, including acts of obtaining a travel time of the acoustic signal from the sender node to the receiver node, immersion depths of the sender node and the receiver node, a sound speed at the immersion depth of the sender node and said estimate of the sound speed profile;

determining an approximated inter-node distance, corresponding to a straight line path between the sender node and the receiver node, as a function of the travel time and the sound speed at the immersion depth of the sender node;

estimating the sound propagation between the sender node and the receiver node, using a sound propagation model and knowing the immersion depths of the sender node and the receiver node, the approximated inter-node distance and the estimate of the sound speed profile, said step of estimating the sound propagation providing an arc length of an arc path between the sender node and the receiver node; and determining an estimate of the inter-node distance, as the difference between said approximated inter-node distance and a distance estimation error defined as the difference between said arc length and said approximated inter-node distance.

2. The method according to claim 1, wherein the act of obtaining the estimate of the sound speed profile is carried out using at least one method belonging to the group consisting of:

methods of consulting at least one sound speed profiles database; or methods of direct measuring, using a measurement device and/or an acoustic method.

3. The method according to claim 1, wherein the act of obtaining the estimate of the sound speed profile is carried out with a method of indirect measuring, using an inversion process which extracts the estimate of the sound speed profile from at least one distorted acoustic signal resulting from the transmission of an acoustic signal between a couple of nodes through said underwater acoustic channel.

4. The method according to claim 3, wherein said inversion process extracts the estimate of the sound speed profile from a distorted acoustic signal resulting from the transmission of said acoustic signal between said sender node and said receiver node through said underwater acoustic channel.

5. The method according to claim 3, wherein at least two iterations of said inversion process are executed exploiting a spatial diversity, using at least two different couples of nodes, and/or a time diversity, using a same couple of nodes at at least two different instants, each iteration providing an intermediate estimate of the sound speed profile, and wherein the step of obtaining the estimate of the sound speed profile comprises a step of combining the intermediate estimates of the sound speed profile to obtain a final estimate of the sound speed profile.

6. The method according to claim 5, wherein said at least two different couples of nodes have different depths, a first and a second couple of nodes being defined as having different depths if a sender node of the first couple has not the same depth as a sender node of the second couple, and/or if a receiver node of the first couple has not the same depth as a receiver node of the second couple.

7. The method according to claim 1, wherein the method is implemented by said receiver node or a centralized system.

8. A non-transitory computer-readable carrier medium storing a program which, when executed by a computer or a processor, causes the computer or the processor to carry out a method of estimating an inter-node distance between a sender node and a receiver node belonging to a network comprising a plurality of nodes arranged along towed acoustic linear antennas, an acoustic signal being transmitted from the sender node to the receiver node through an underwater acoustic channel, the method comprising estimating with the computer or processor the inter-node distance as a function of an estimate of a sound speed profile of the underwater acoustic channel, said sound speed profile depending on depth, wherein estimating comprises:

obtaining a travel time of the acoustic signal from the sender node to the receiver node, immersion depths of the sender node and the receiver node, a sound speed at the immersion depth of the sender node and said estimate of the sound speed profile;

determining an approximated inter-node distance, corresponding to a straight line path between the sender node and the receiver node, as a function of the travel time and the sound speed at the immersion depth of the sender node;

estimating the sound propagation between the sender node and the receiver node, using a sound propagation model and knowing the immersion depths of the sender node and the receiver node, the approximated inter-node distance and the estimate of the sound speed profile, said step of estimating the sound propagation providing an arc length of an arc path between the sender node and the receiver node; and determining an estimate of the inter-node distance, as the difference between said approximated inter-node distance and a distance estimation error defined as the difference between said arc length and said approximated inter-node distance.

9. A device for estimating an inter-node distance between a sender node and a receiver node belonging to a network comprising a plurality of nodes arranged along towed acoustic linear antennas, wherein the device comprises:

either a reprogrammable computing machine, comprising a read-only memory, a random access memory and a processor, or a dedicated hardware machine or component, configured to perform acts comprising:

receiving an acoustic signal being transmitted from the sender node to the receiver node of the network through an underwater acoustic channel; and estimating the inter-node distance between the sender node and the receiver node belonging to the network comprising the plurality of nodes arranged along the towed acoustic linear antennas, wherein estimating comprises:

estimating the inter-node distance as a function of an estimate of a sound speed profile of the underwater acoustic channel, said sound speed profile depending on depth, including:

obtaining a travel time of the acoustic signal from the sender node to the receiver node, immersion depths of the sender node and the receiver node, a sound speed at the immersion depth of the sender node and said estimate of the sound speed profile;

determining an approximated inter-node distance, corresponding to a straight line path between the sender node and the receiver node, as a function of the travel time and the sound speed at the immersion depth of the sender node;

estimating the sound propagation between the sender node and the receiver node, using a sound propagation model and knowing the immersion depths of the sender node and the receiver node, the approximated inter-node distance and the estimate of the sound speed profile, said step of estimating the sound propagation providing an arc length of an arc path between the sender node and the receiver node; and determining an estimate of the inter-node distance, as the difference between said approximated inter-node distance and a distance estimation error defined as the difference between said arc length and said approximated inter-node distance.

* * * * *